United States Patent
Upadhyay et al.

(10) Patent No.: US 8,423,057 B1
(45) Date of Patent: Apr. 16, 2013

(54) ACTIVATING A MESSAGE BLOCKING FUNCTION FROM A MOBILE COMMUNICATION

(75) Inventors: Piyush Upadhyay, Mission, KS (US); William James Routt, Leawood, KS (US); Jamie L. Kennedy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 844 days.

(21) Appl. No.: 12/204,028

(22) Filed: Sep. 4, 2008

(51) Int. Cl.
*H04W 4/00* (2009.01)

(52) U.S. Cl.
USPC ........ 455/466; 455/414.1; 455/418; 455/437; 455/412.2

(58) Field of Classification Search .................. 455/466, 455/415, 410, 414.1, 412.2, 418, 437
See application file for complete search history.

(56) References Cited

U.S. PATENT DOCUMENTS

| | | | |
|---|---|---|---|
| 6,701,160 B1 * | 3/2004 | Pinder et al. ............... 455/550.1 |
| 6,920,331 B1 * | 7/2005 | Sim et al. ...................... 455/466 |
| 7,245,929 B2 * | 7/2007 | Henderson et al. ........... 455/466 |
| 7,650,140 B2 * | 1/2010 | Plumb et al. ................ 455/414.1 |
| 7,797,379 B2 * | 9/2010 | Hawkins ........................ 709/203 |
| 7,966,027 B1 * | 6/2011 | Dudziak et al. ................ 455/466 |
| 2003/0083078 A1 * | 5/2003 | Allison et al. ................ 455/466 |
| 2004/0198454 A1 * | 10/2004 | Chavez et al. ................ 455/565 |
| 2005/0020289 A1 * | 1/2005 | Kim et al. ...................... 455/466 |
| 2006/0135168 A1 * | 6/2006 | Cai et al. ........................ 455/445 |
| 2006/0135184 A1 * | 6/2006 | Schmidt et al. ............... 455/466 |
| 2007/0026879 A1 * | 2/2007 | Ala-Luukko ................. 455/466 |
| 2007/0165821 A1 * | 7/2007 | Altberg et al. ........... 379/210.02 |
| 2007/0238449 A1 * | 10/2007 | Park et al. ..................... 455/417 |
| 2007/0254683 A1 * | 11/2007 | Jie et al. ........................ 455/466 |
| 2008/0009299 A1 * | 1/2008 | Ryu .............................. 455/466 |
| 2008/0268883 A1 * | 10/2008 | Shim ............................. 455/466 |
| 2009/0156166 A1 * | 6/2009 | Van Der Weide ............. 455/411 |

* cited by examiner

*Primary Examiner* — Kamran Afshar
*Assistant Examiner* — Mong-Thuy Tran (57) ABSTRACT

A system, method, and computer readable media are provided for allowing a user to block messages by sending a text message containing the source address that is to be blocked to a provisioning component that updates a block list. Messages addressed to the requesting user that originate from the source address are then dropped by the network before they are communicated to the requesting user. Source addresses may also be removed from the block list by sending a second text message to the provisioning component with the source address.

14 Claims, 4 Drawing Sheets

ACTIVATING A MESSAGE BLOCKING FUNCTION FROM A MOBILE COMMUNICATION

SUMMARY

The present invention is defined by the claims below. Embodiments of the present invention allow a user of a mobile-communication device to generate an instruction that causes messages (e.g., SMS, MMS) originating from a specified mobile device to be blocked. The present invention has several practical applications in the technical arts including allowing a mobile-device user to prevent unwanted messages from being sent to the user.

In a first aspect, one or more computer-readable media having computer-executable instructions embodied thereon for performing a method of blocking messages sent to a first communication device from a second communication device are provided. The method includes receiving, from the first communication device, a first text message including a phone number for the second communication device. The method also includes causing the phone number to be added to a block list associated with the first communication device, wherein a message from the phone number is not delivered to the first communication device because the phone number is on the block list.

In another aspect, a computerized system for screening messages sent to a first mobile-communication device is provided. The system includes a data store that contains a block list for storing a list of one or more source addresses associated with a destination address. The messages originating from the one or more source addresses are not communicated to the destination address. The system also includes a routing component for communicating the messages to the first mobile-communication device. The routing component does not communicate a message originating from a source address on the block list that is associated with the destination address for the first mobile-communication device. The system also includes an update component that adds a new source address received in a first text message sent from the first mobile-communication device to the block list. The new source address is added to the one or more source addresses associated with the destination address for the first mobile-communication device.

In a final aspect, one or more computer-readable media having computer-executable instructions embodied thereon for performing a method of auto-generating a text message with instructions to block messages addressed to a mobile-communication device that originate from a source address is provided. The method includes receiving an input from a user of a first mobile-communication device indicating that messages originating from the source address are to be blocked. The method also includes, without additional input from the user, generating the text message containing the source address that is addressed to a network component having a capability to update a block list associated with the first mobile-communication device. The method further includes, without additional input from the user, transmitting the text message to the network component, thereby causing the source address to be added to the block list.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for allowing a user of a communication device to block messages originating from a designated address. In one embodiment, the block messages are short message service (SMS) messages or multimedia message service (MMS) messages. The originating address may be a phone number. In one embodiment, the user blocks messages from an originating address by including the address in a text message sent to a network component responsible for adding origination addresses to a block list.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile-communications |
| HLR | Home Location Register |
| IMS | IP Multimedia Subsystem |
| LAN | Local Access Network |
| MMS | Multimedia Messaging Service |
| MMSC | Multimedia Messaging Service Center |
| MSC | Mobile Switching Center |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product.

Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for allowing messages sent from a source address to be blocked. The term "message" refers to messages communicated between components within a messaging network. Typically, the message is communicated in telecommunications protocol. The "SMS" and "MMS" standards for telephony message systems are considered as a potential embodiment of the telecommunications protocol that may be used to communicate the messages discussed hereinbelow. In particular, short messaging service (SMS) is typically a transport architecture for sending text messages (e.g., 160 characters or less), while multimedia messaging service (MMS) allows for sending messages that include multimedia objects (e.g., images, audio, video, rich text, etc.). These messaging systems are mainly deployed in wireless networks where a short messaging service center (SMSC), or a multimedia messaging service center (MMSC) provides a store-and-forward mechanism where a notification may be sent to a user of a mobile device upon receiving a message. The user may then request to retrieve the message that is communicated for presentation on the mobile device. Although SMS and MMS telecommunications protocol are discussed below, they are only two examples of suitable message systems within a network environment and are not intended to suggest any limitation as to scope of use or functionality of the invention. Neither should the invention be interpreted as having any dependency or requirement relating to any one or combination of particular telecommunications protocols depicted in the exemplary discussion herein.

Figure 1:
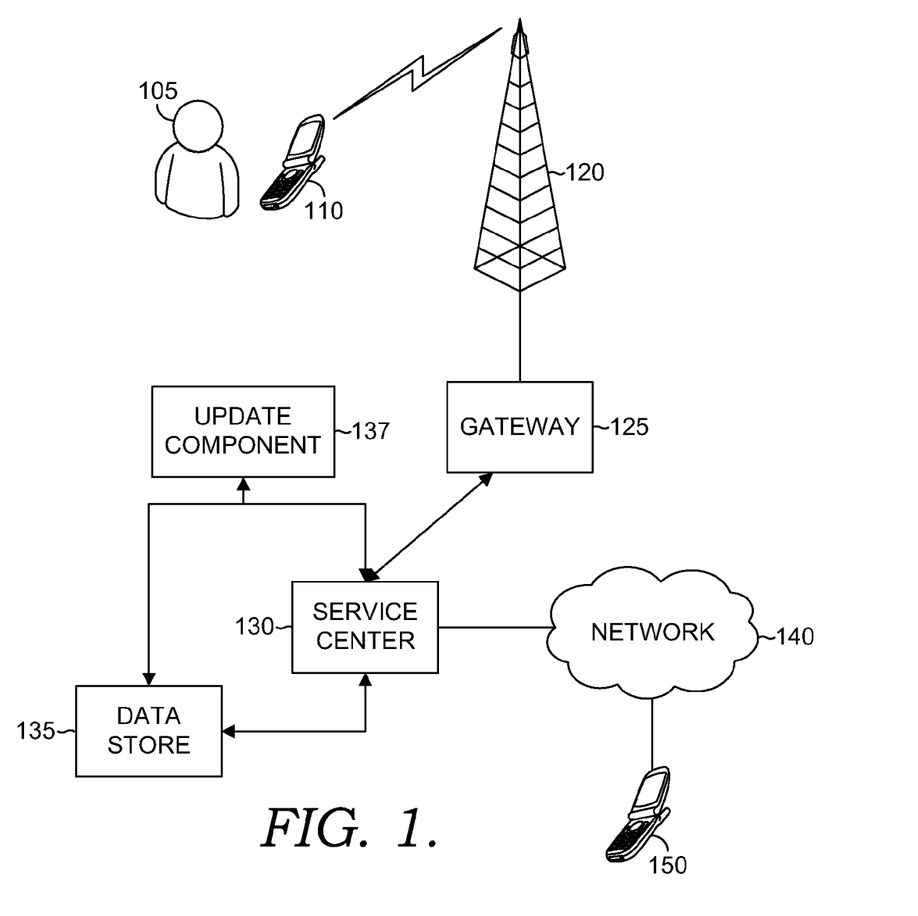
FIG. 1 depicts an illustrative environment in which the present invention may operate.

Embodiments of the present invention may be practiced in a communications network providing service to a mobile device. An illustrative operating environment 100 that contains a few of the components within such a communication network is shown in FIG. 1. The components shown in FIG. 1 are the primary components employed during operation of embodiments of the present invention. The components shown in FIG. 1 are described in brief, and with an emphasis on function for the sake of simplicity. The components within FIG. 1 are communicatively coupled to each other in a manner appropriate for carrying out their respective function within the operating environment 100. Embodiments of the present invention are not limited by the communication protocols or formats used to facilitate communication between components; those mentioned are for the sake of enablement and not meant to be limiting.

Mobile-communication device 110 is a wireless terminal that is adapted to receive communications and media over the wireless networks included in operating environment 100. Some lower-level details of mobile-communication device 110 are not shown so as to not obscure embodiments of the present invention. For example, mobile-communication device 110 may include a bus that directly or indirectly couples the following devices: memory, one or more processors, one or more presentation components such as a display or speaker, input/output (I/O) ports, I/O components, and a power supply such as a battery. Mobile-communication device 110 may communicate via wireless protocols, such as code division multiple access ("CDMA"), global system for mobile-communications ("GSM"), or time division multiple access ("TDMA"), as well as others, to communicate with base station 120.

Mobile-communication device 110 may take on any of a variety of forms. By way of example, mobile-communication device 110 may be a mobile telephone, pager, computing device, personal digital assistant ("PDA") or any combination of these or other devices. Mobile-communication device 110 may have the ability to present one or more forms of media content. Examples of media content that could be displayed include, digital pictures, TV shows, movies, videos, MP3 files, and radio programs. This list is not exhaustive. The media may be presented as it is received from the wireless network or from memory within mobile-communication device 110. Mobile-communication device 110 may also be capable of receiving one or more forms of communication. Examples of communications that may be received include, phone calls, video calls, text messages, multimedia messages, emails, calendar updates, and task reminders.

User 105 is a person who is associated with mobile-communication device 110. For example, a phone call placed to mobile-communication device 110 would be intended for user 105. User 105 is the ultimate recipient of communications (e.g. emails, phone calls, text messages) and media content sent to mobile device 130.

Base station 120 is a fixed station used for communicating with mobile-communication device 110. Standard air interface protocols, such as code division multiple access ("CDMA"), global system for mobile-communications ("GSM"), or time division multiple access ("TDMA"), as well as others, may be used by base station 120 to communicate with mobile-communication device 110. Other network communication interface arrangements are also possible. A base station controller (not shown) is responsible for handling traffic and signaling with mobile-communication device 110. Only one base station 120 is shown, and without its many components, for the sake of clarity. Mobile-communication device 110 could be in simultaneous communication with multiple base stations.

Access gateway 125 provides a boundary between radio communication functions embodied in one or more radio access systems that form the access-facing portion of illustrative operating environment 100 and the standard internet protocol ("IP") communication functions (including Mobile IP) embodied in the public-network facing portion (e.g., network 140) of illustrative operating environment 100. Access gateway 125 might be, for example, an ASN-GW, a PDSN, a SGSN/GGSN, and the like.

Service center 130 helps direct messages between communication devices. In one embodiment the service center is a short messaging service center ("SMSC"). When a user sends a text message to another user, the message gets stored at an SMSC (or associated storage device) until the destination device is available to download the message. In another embodiment, the service center 130 is a multimedia messaging service center ("MMSC") that stores and delivers multimedia messages. Service center 130 checks a block list in data store 135. The block list contains originating addresses that are blocked for an individual destination address. If the message is from an address on the recipient's block list then the service center 130 drops the message or otherwise makes sure the message is not delivered to the destination device.

The update component 137 adds and removes addresses to the block list in data store 135. In one embodiment, the update component 137 receives a text message from a mobile-communication device 110 with a source address in the text message. The update component 137 then adds the source address to the mobile-communication device's block list. The update component 137 may remove the source address from the mobile-communication device's block list upon receiving a second text message from the mobile-communication device 110 including the source address.

Network 140 may include one or more mobile networks, one or more packet-based networks, including the Internet, and the public switched telephone network ("PSTN"). The various components within network 140 may be owned and/or operated by multiple entities, commercial or otherwise. Network 140 is configured to transmit a variety of communication formats including phone calls, emails, text messaging, multimedia messages, faxes, instant messaging, pages, voice mails, photographs, audio files, movies, TV shows, calendar reminders, task reminders, and other files containing communicative content.

The second communication device 150 is any communication device capable of sending messages. Examples of such a communication device include a PDA, cell phone, smart phone, and personal computer.

Figure 2:
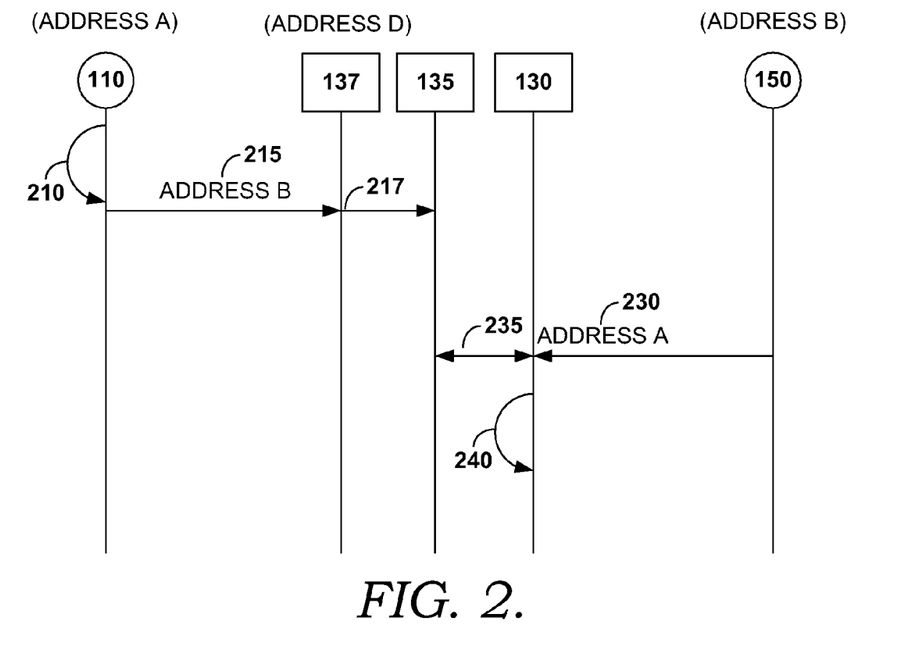
FIG. 2, a system for blocking messages sent to a first mobile-communication device from a second communication device is illustrated according to an embodiment of the present invention.

Turning now to FIG. 2, communications between components that block messages sent to a mobile-communication device 110 from a second communication device 150 are illustrated. The mobile-communication device 110, data store 135, the update component 137, the service center 130, and the second communication device 150 have been described previously with reference to FIG. 1. The illustrated communications may occur in an environment similar to illustrative operating environment 100 described previously. The mobile-communication device 110 sends a text message 215 addressed to address D (associated with the update component 137) and containing address B (associated with the second communication device 150) in the message content. Text message 215 is received by update component 137. Multiple components may exist between mobile-communication device 110 and update component 137. The update component 137 is associated with an address to which text messages may be directed. In FIG. 2, update component 137 is associated with address D. In one embodiment, address D is a short code. Short codes are special telephone numbers that are significantly shorter than full telephone numbers. Short codes may be used to address SMS and MMS messages. A short code may be unique to an individual operating network. In embodiments of the present invention, the mobile-communication device 110 may be associated with a telecommunications organization that is also associated with the update component 137.

Update component 137 is able to add and subtract destination and source addresses from a block list within data store 135. The block list associates an address, such as address A (associated with mobile-communication device 110), with one or more source addresses. Messages sent to address A from source addresses on the block list for address A are dropped or otherwise blocked. The block list associated with an address may contain multiple source addresses. A destination address is the address to which a message is addressed. A source address is an address from which a message originates. The update component 137 updates the block list upon receiving a text message containing an address. The block list is updated by adding one or more addresses within the text message to the block list associated with the address from which the message originated. In one embodiment, if the update component receives a message from a first address containing a second address that is already on the block list associated with the first address, then the address is removed from the block list associated with the source address.

Thus, in the example shown in FIG. 2, upon receiving text message 215 containing address B, the update component 137 adds 217 address B to the block list associated with address A. In one embodiment address A and address B are both phone numbers. Subsequent to sending text message 215, message 230 is sent from second communication device 150, which is associated with address B. Message 230 is addressed to address A, which is associated with mobile-communication device 110. Upon receiving message 230, the service center 130 consults 235 the block list for address A and determines that address B is on the list. Upon making this determination, message 230 is dropped 240 and not forwarded to address A.

Figure 3:
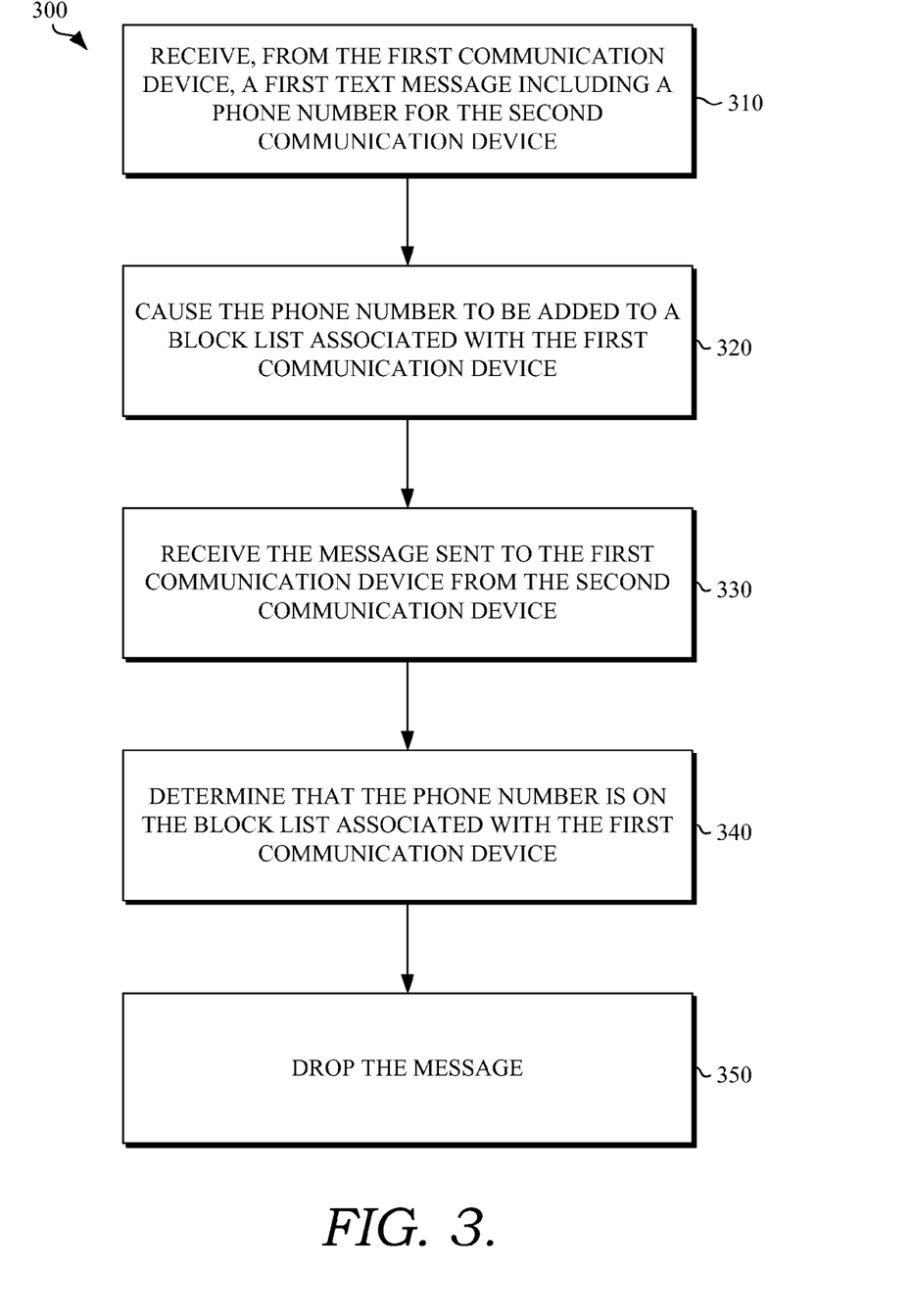
FIG. 3 is a flow diagram in which a method of blocking messages sent to a first communication device from a second communication device is shown according to an embodiment of the present invention.

Turning now to FIG. 3, a flow chart illustrating a method of blocking messages sent to a first communication device from a second communication device is shown, in accordance with an embodiment of the present invention. At step 310, a first text message is received from the first communication device. The first text message includes a phone number for the second communication device. In one embodiment, the only information in the content of the first text message is the phone number for the second communication device. In another embodiment, additional information is included in the text message.

At step 320, a phone number for the second communication device is added to a block list associated with the first communication device. The phone number is taken from the text message received at step 310. As stated previously, the phone number may be the only content in the text message. However, if other content other than the phone number is included in the text message, then the phone number is parsed from the message content. The parsing process may recognize phone numbers in various formats. Once the phone number is added to the first communication device's block list, a message sent from a phone number on the first communication device's block list will not be delivered to the first communication device.

At step 330, a message addressed to the first communication device is received from the second communication device. At step 340, the second communication device's phone number is determined to be on the first communication device's block list. At step 350, the message is dropped because the it is from a phone number on the first communication device's block list. By dropping the message the message is effectively blocked from receipt by the first communication device. Other methods of blocking the blocked message may be used. As described previously, the block message may be one or more of a short messaging service (SMS message) and a multimedia messaging service (MMS message). In one embodiment, the first mobile-communication device is one or more of a cell phone, a PDA, and a smart phone.

The phone number may be removed from the block list by sending a second text message from the first communication device. The second text message includes the phone number for the second communication device. In response to receiving the second text message, the phone number associated with the second communication device is removed from the first communication device's block list. In one embodiment, the first text message and the second text message are addressed to a short code. Short code has been described previously with reference to FIG. 2. In another embodiment, the first text message is addressed to a first short code and the second text message is addressed to a second short code.

Figure 4:
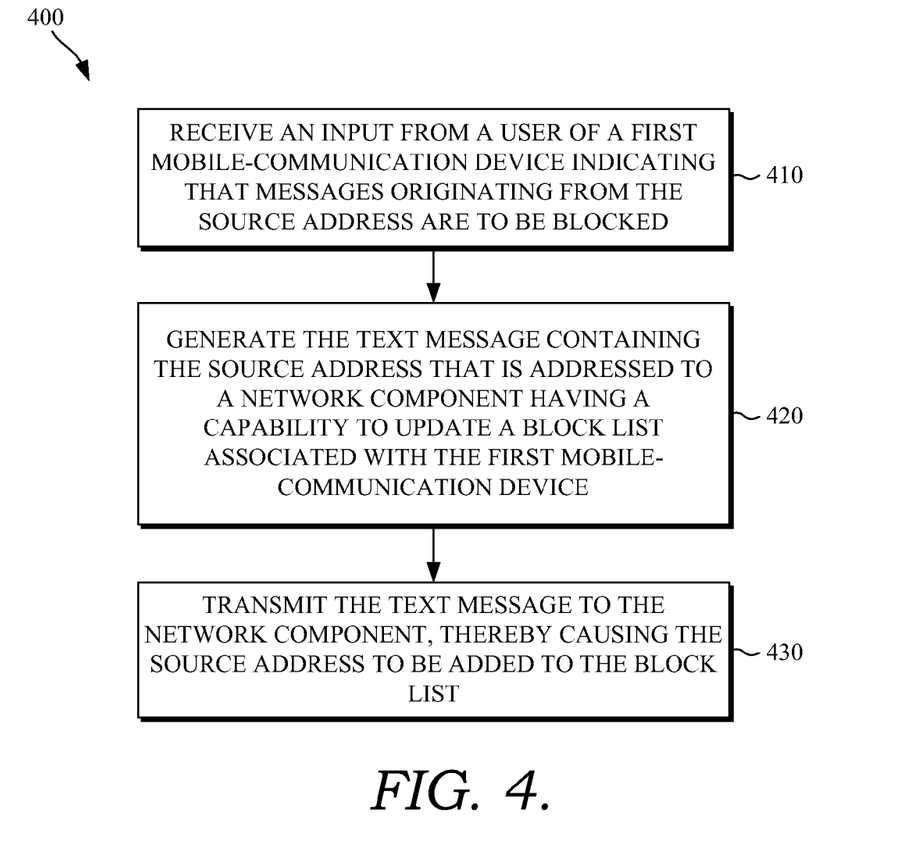
FIG. 4 is a flow diagram in which a method of auto generating a text message with instructions to block messages addressed to a mobile-communication device that originates from a source address is shown according to an embodiment of the present invention.

Turning now to FIG. 4, a flowchart showing a method of auto generating a text message with instructions to block messages addressed to a mobile-communication device that originates from a source address is shown, in accordance with an embodiment of the present invention. At step 410, an input from a user of the first mobile-communication device is received. The input indicates that messages originating from the source address are to be blocked. For example, the user may select a "block sender" button on a user interface displayed on the first communication device. Additional embodiments of user input are explained below. In one embodiment, the source address is a phone number. At step 420, without user intervention, a text message containing the source address is generated. The auto generated text message is addressed to a network component having the capability to update a block list that is associated with the first mobile-communication device. As described previously, the address of the network component may be a short code. At step 430, without user intervention, the auto generated text message is transmitted to the network component, thereby causing the source address to be added to the block list associated with the first mobile-communication device.

In one embodiment, a message is displayed on a user interface on the first mobile-communication device. Upon receiving the input from the user, the source address is retrieved from the message. In one embodiment, the input from the user is entering a soft key. Thus, upon receiving a message from a source the user wishes to block, all the user must do is simply push a soft key. In response to pushing the soft key, the source address is retrieved from the displayed message and inserted into an auto-generated text message that is sent to a network component capable of modifying the block list associated with the first communication device.

In another embodiment, a message is displayed on the first communication device in conjunction with a selection component, such as a "block sender" button. Upon receiving input from the user indicating selection of the selection component, the source address is retrieved from the displayed message. The source address is inserted into the text message that is sent to the network component capable of modifying the block list associated with the first communication device. Thus, upon receiving a message from a source the user wishes to block, all the user must do is select the selection component.

In one embodiment, a user interface for composing a text message is displayed. The address for the network component is entered into the text message by the user along with the source address the user wishes to block. This text message is then sent by the user along with the source address the user wishes to block to the network component capable of modifying the block list associated with the first communication device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon for performing a method of blocking a message sent to a user's communication device from a second communication device, the method comprising:

receiving, from the user's communication device, a first short messaging service (SMS) text message addressed to a first short code, wherein the first SMS text message includes a phone number of the second communication device, wherein the phone number indicates a selection by the user to block messages from the second communication device, and wherein the first SMS text message is received at a network component that accesses a block list associated with the user's mobile device;

upon receiving the first SMS text message addressed to the first short code, causing the phone number received in the first SMS text message from the user's communication device to be added to the block list associated with the user's communication device, wherein a message from the phone number is not delivered to the user's communication device because the phone number received in the text message from the user's communication device is on the block list;

receiving, from the user's communication device, a second SMS text message addressed to a second short code that is different than the first short code, wherein the second SMS text message includes the phone number for the second communication device; and upon receiving the second SMS text message addressed to the second short code, causing the phone number to be removed from the block list associated with the first communication device.

2. The media of claim 1, wherein the method further includes:

receiving the message sent to the user's communication device from the second communication device;

determining that a phone number included in the message is on the block list associated with the user's communication device; and dropping the message.

3. The media of claim 1, wherein the message is one or more of a short messaging service (SMS) message and a multimedia messaging service (MMS) messages.

4. The media of claim 1, wherein the user's communication device is a mobile-communication device including one or more of a cell phone, a PDA, and a smart phone.

5. A computerized system for screening messages sent to a first mobile communication device ("mobile device"), the system comprising:

a data store that contains a block list associated with the first mobile device, wherein the block list stores a list of one or more source addresses, wherein messages originating from the one or more source addresses are not communicated to the first mobile device's destination address;

a service center for communicating the messages to the first mobile device, wherein the service center blocks a message sent to the first mobile device from a second mobile device when the second mobile device's source address is in the first mobile-communication device's block list; and an update component that adds a source address, received in a first short messaging service (SMS) text message sent from the first mobile-communication device, to the block list, wherein the source address is added to the block list when the first SMS text message is addressed to a first short code, and wherein the update component removes the source address from the block list when the source address is received in a second SMS text message sent from the mobile device when the second SMS text message is addressed to a second short code.

6. The system of claim 5, wherein the message is one or more of a short messaging service (SMS) message and a multimedia messaging service (MMS) message.

7. The system of claim 5, wherein the second mobile device's source address is a phone number.

8. The system of claim 7, wherein the first SMS text message contains only the phone number.

9. One or more nontransitory computer-readable media having computer-executable instructions embodied thereon for performing a method of auto-generating short messaging service (SMS) text messages with instructions to block or unblock messages addressed to a user's mobile-communication device that originate from a source address, the method comprising:

at the user's mobile-communication device, receiving a first input from the user indicating that messages originating from the source address are to be blocked;

at the user's mobile-communication device, without additional input from the user, generating a first SMS text message containing the source address indicated by the user, wherein the first SMS text message is addressed to a network component having a capability to update a block list associated with the user's mobile-communication device; and at the user's mobile-communication device, without additional input from the user, transmitting the SMS text message to the network component by way of a first short code, wherein the source address is added to the block list;

at the user's mobile-communication device, receiving a second input from the user indicating that messages originating from the source address are no longer to be blocked;

at the user's mobile-communication device, without additional input from the user, generating a second SMS text message containing the source address indicated by the user; and at the user's mobile-communication device, without additional input from the user, transmitting the SMS text message to the network component by way of a second short code that is different than the first short code, wherein the source address is removed from the block list.

10. The media of claim 9, wherein the method further includes:

displaying a message on a user interface on the user's mobile-communication device;

upon receiving the first input from the user, retrieving the source address from the message; and wherein the first input from the user includes the user entering a soft key.

11. The media of claim 9, wherein the method further includes:

displaying a message on a user interface on the user's mobile-communication device;

displaying on the user interface a selection component;

upon receiving the first input from the user, retrieving the source address from the message; and wherein the first input from the user includes the user selecting the selection component.

12. The media of claim 9, wherein the method further includes:

displaying a user interface for composing text messages;

receiving an address for the network component from the user; and wherein the first input includes the user entering in the source address into the user interface.

13. The media of claim 9, wherein the source address is a phone number.

14. The media of claim 13, wherein the messages are one or more of a short messaging service (SMS) message and a multimedia messaging service (MMS) message.

* * * * *

UNITED STATES PATENT AND TRADEMARK OFFICE
CERTIFICATE OF CORRECTION

| | |
|---|---|
| PATENT NO. | : 8,423,057 B1 |
| APPLICATION NO. | : 12/204028 |
| DATED | : April 16, 2013 |
| INVENTOR(S) | : Piyush Upadhyay et al. |

It is certified that error appears in the above-identified patent and that said Letters Patent is hereby corrected as shown below:

Title page, Item (54), and in the Specification, Column 1, Lines 1-4, Title should read as follows:

"ACTIVATING A MESSAGE BLOCKING FUNCTION FROM A MOBILE COMMUNICATION DEVICE"

Signed and Sealed this
Third Day of December, 2013

Margaret A. Focarino
*Commissioner for Patents of the United States Patent and Trademark Office*